(12) United States Patent  (10) Patent No.: US 8,056,509 B1
Hostetler  (45) Date of Patent: Nov. 15, 2011

(54) ARTICULATED PRESSURE REGULATOR WITH PIVOTAL LINKAGE WITH RESPECT TO ANIMAL DRINKER

(75) Inventor: Robert D. Hostetler, Middlebury, IN (US)

(73) Assignee: Ziggity Systems, Inc., Middlebury, IN (US)

( * ) Notice: Subject to any disclaimer, the term of this patent is extended or adjusted under 35 U.S.C. 154(b) by 452 days.

(21) Appl. No.: 12/355,927

(22) Filed: Jan. 19, 2009

(51) Int. Cl.
*A01K 7/00* (2006.01)
(52) U.S. Cl. ............................................ 119/72; 119/81
(58) Field of Classification Search .................... 119/72, 119/72.5, 77, 81
See application file for complete search history.

(56) References Cited

U.S. PATENT DOCUMENTS

| | | | | |
|---|---|---|---|---|
| 3,664,305 A * | 5/1972 | Hart et al. | ......................... | 119/72 |
| 3,669,077 A * | 6/1972 | Spierenburg | ................. | 119/72.5 |
| 3,724,425 A * | 4/1973 | Thompson | ...................... | 119/72 |
| 4,441,459 A * | 4/1984 | Giordano | ......................... | 119/72 |
| 4,724,797 A * | 2/1988 | Steudler, Jr. | ..................... | 119/72 |
| 5,025,754 A * | 6/1991 | Plyler | ............................. | 119/73 |
| 5,136,983 A * | 8/1992 | Hostetler et al. | ................ | 119/72 |
| 5,184,570 A * | 2/1993 | Hostetler | ........................ | 119/72 |
| 5,184,571 A * | 2/1993 | Hostetler et al. | ................ | 119/72 |
| 5,282,440 A * | 2/1994 | Hostetler | ........................ | 119/72 |
| 5,284,110 A * | 2/1994 | Hostetler | ........................ | 119/72 |
| 5,339,768 A * | 8/1994 | Schumacher | ................... | 119/72 |
| 5,429,072 A * | 7/1995 | Schumacher | ................... | 119/74 |
| 5,870,970 A * | 2/1999 | Katz | ............................... | 119/72 |

* cited by examiner

*Primary Examiner* — Kimberly Smith
(74) *Attorney, Agent, or Firm* — Botkin & Hall, LLP

(57) ABSTRACT

A drinker system having a pressure regulator that receives water at its inlet and provides water at a predetermined pressure at its outlet. At least one drinker is connected to the outlet of the pressure regulator. The pressure regulator is moveable between a lower position and an upper position relative to the drinker. When the pressure regulator is moved to its upper position relative to the drinker, the drinker receives a higher pressure than the predetermined pressure at the outlet of the pressure regulator.

The pressure regulator is connected to the drinker with a four bar linkage having a pair of bars that are substantially parallel to each other. Each of the bars is pivotally connected to the drinker at one end and the opposite ends of the bars are pivotally connected to the pressure regulator.

16 Claims, 12 Drawing Sheets

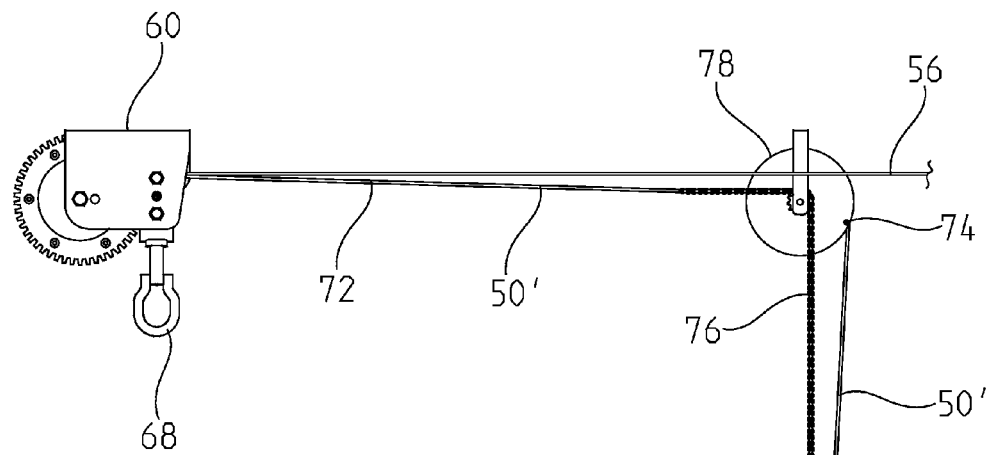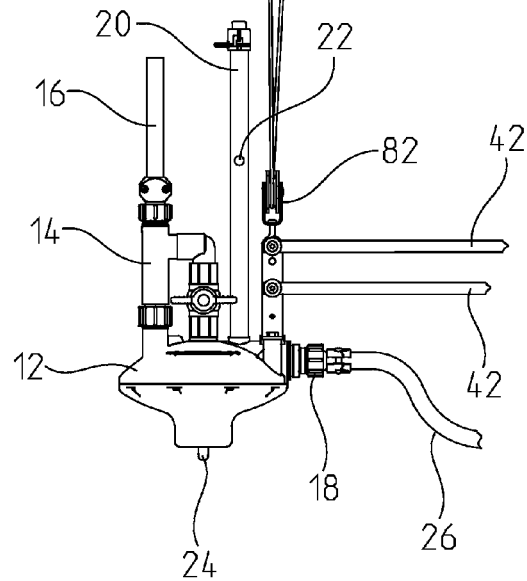
FIG. 8

ARTICULATED PRESSURE REGULATOR WITH PIVOTAL LINKAGE WITH RESPECT TO ANIMAL DRINKER

BACKGROUND OF THE INVENTION

As livestock animals grow, particularly poultry, the amount of water they need to drink will generally increase. Properly hydrated birds are generally better producers of poultry products than a bird that receives inadequate water. Due to changing needs for water as birds grow, drinker systems that provide water to birds allow for pressure adjustment to drinkers from which the birds drink. Higher pressure water delivered at the drinker makes obtaining enough water easier for the birds.

Adjusting multiple drinker lines in a house containing poultry has typically been a tedious task. Usually multiple drinker lines are installed in a house, and each one will have a pressure regulator to serve all the drinkers attached to that particular line. A user of such a system is required to bend down close to the ground and adjust each pressure regulator. A more desirable system would allow adjustment of multiple pressure regulators at one time or adjust the pressure at the drinkers at the same time the drinker line is raised.

SUMMARY OF THE INVENTION

The drinker system of this invention includes a pressure regulator for providing water at a predetermined pressure at its outlet. The pressure regulator receives water at its inlet. At least one drinker is connected to the outlet of the pressure regulator. The pressure regulator is moveable between a lower position and an upper position relative to the drinker. When the pressure regulator is moved to its upper position relative to the drinker, the drinker receives a higher pressure than the predetermined pressure at the outlet of the pressure regulator.

A flexible hose connects the outlet of the pressure regulator to the drinker. The pressure regulator is connected to the drinker with a four bar linkage having a pair of bars that are substantially parallel to each other. Each of the bars is pivotally connected to the drinker at one end, and the opposite ends of the bars are pivotally connected to the pressure regulator. As such when the pressure regulator is moved between its upper and lower positions, it will remain at the same angle relative to horizontal.

BRIEF DESCRIPTION OF THE DRAWINGS

FIG. 8 is a side view of the pressure regulator shown in FIG. 1 showing how the winch and geared sheave interact;

DETAILED DESCRIPTION OF INVENTION

Figure 2:
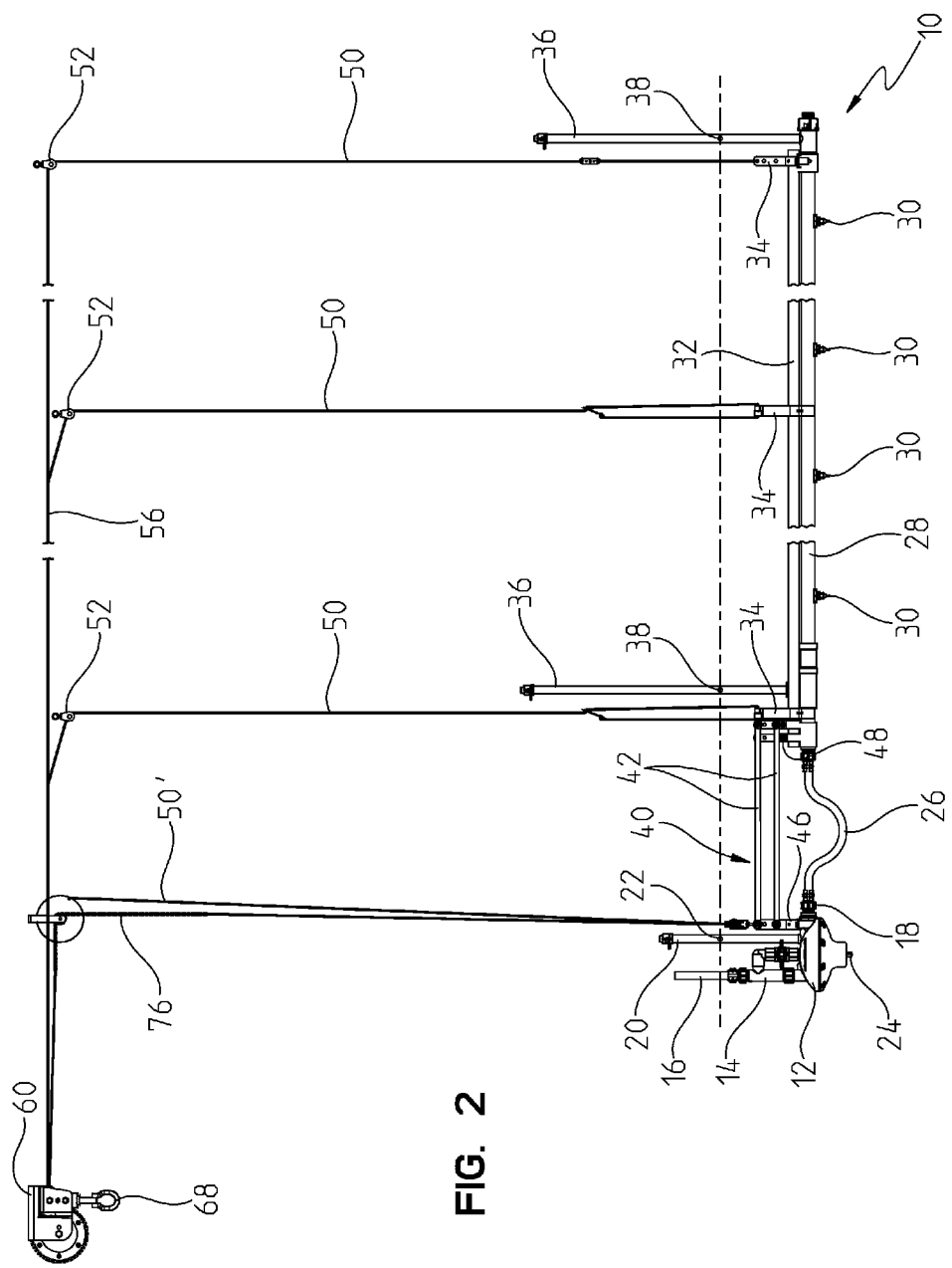
FIG. 2 is a side view of the drinker system shown in FIG. 1 with broken segments for illustrative purposes and the pressure regulator in its fully lowered position.

FIG. 2 shows a side view of the drinker system 10 that is particularly useful in watering poultry, but may be used with other animals as well. The drinker system 10 has a pressure regulator 12 that has an inlet 14 for receiving water that is attached to an inlet hose 16 supplying water. The inlet hose 16 typically supplies water from a conventional plumbing system in a building housing animals. The pressure regulator also has an outlet 18 that discharges water from the pressure regulator 12 at a pressure less than that of water supplied at the inlet 14. The pressure in the outlet 18 is indicated by a stand pipe 20, which is in fluid communication with the outlet 18. The pressure is indicated by the level of water in the stand pipe 20, which represents a head equal to the height of water in the stand pipe 20. A float ball 22 that floats at the water's surface is included inside the stand pipe 20 to make seeing the water level easier. The pressure delivered at the outlet 18 of the pressure regulator 12 may be changed by using an adjustment knob 24 on the bottom of the regulator 12. The pressure regulator 12 shown may be of the type disclosed in U.S. Pat. No. 4,344,456.

Figure 3:
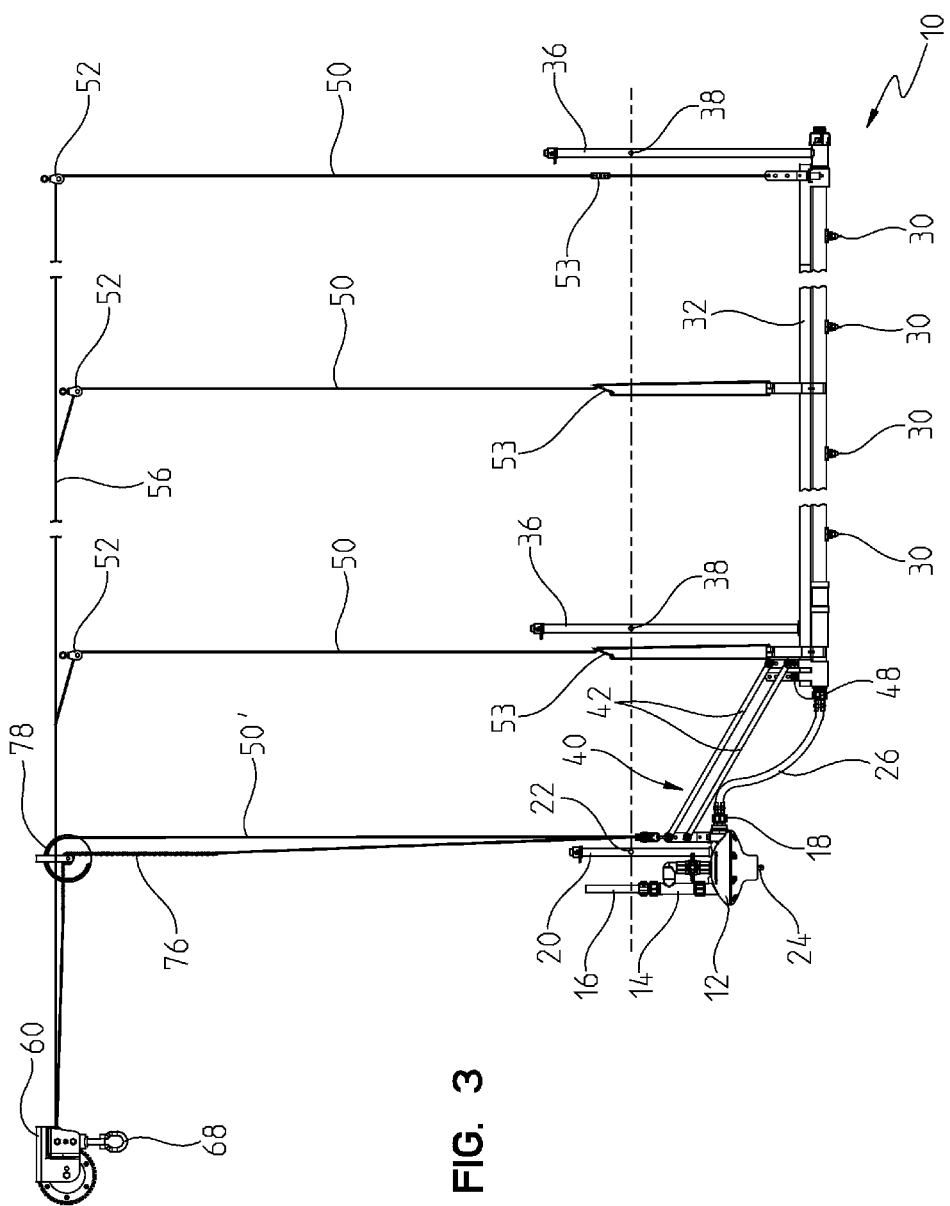
FIG. 3 is a side view of the drinker system shown in FIG. 2 with the pressure regulator in a raised position.
Figure 4:
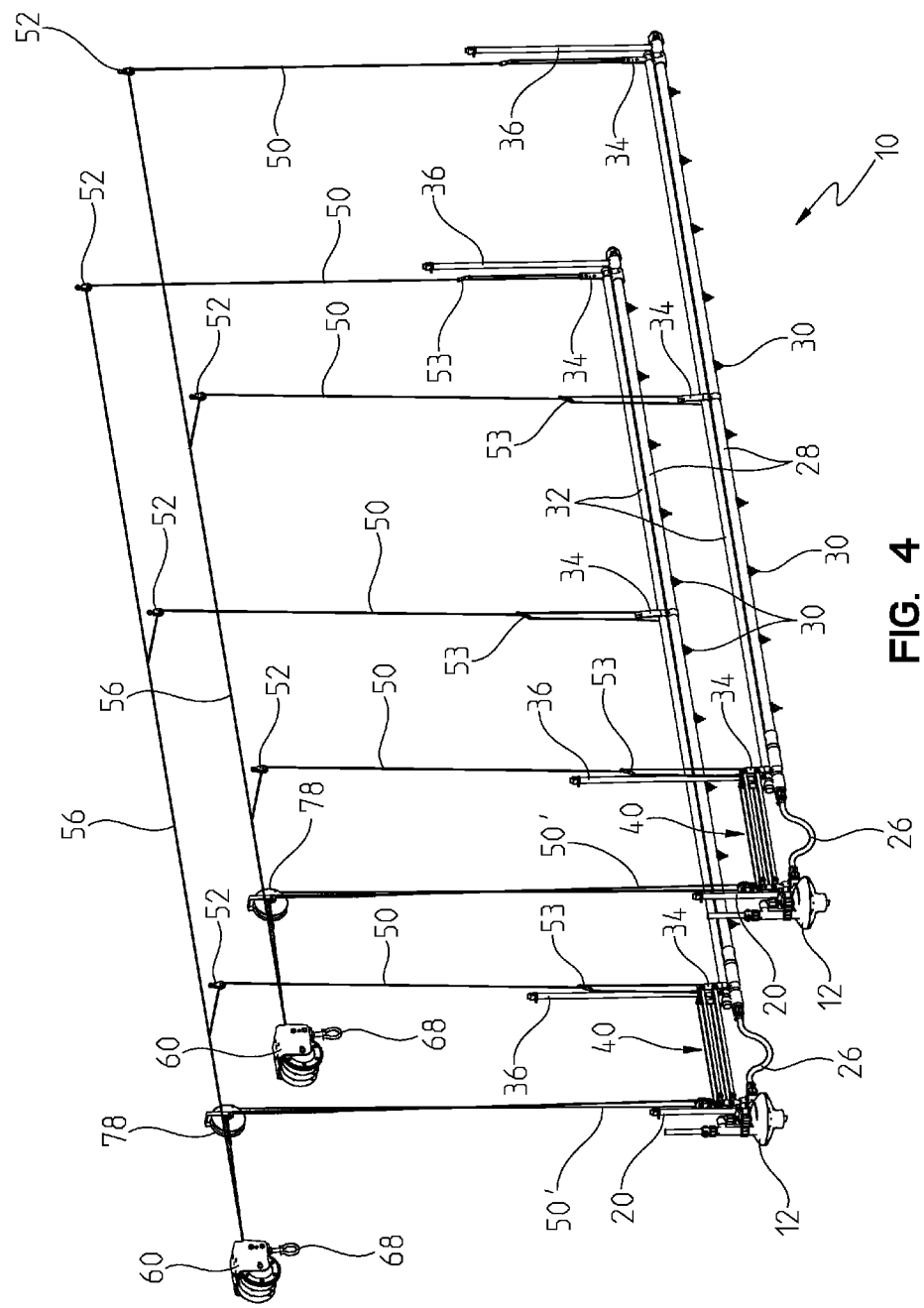
FIG. 4 is a perspective view of the drinker system shown in FIGS. 1-3 installed with multiple drinker lines suspended from a ceiling.

A flexible outlet hose 26 is connected to the outlet 18 and a drinker pipe 28. The drinker pipe 28 has a plurality of drinkers 30 attached along the bottom of the pipe 28 for delivering water to animals. The outlet hose 26 provides fluid communication between the drinkers 30 to the outlet 18. Water freely travels through the outlet hose 26, and travels along the inside of the drinker pipe 28 along its entire length. The drinker pipe 28 is typically made of plastic and is supported along its length with a metal support pipe 32 attached to the drinker pipe 28 with brackets 34 along their lengths. The drinker pipe 28 has at least one stand pipe 36 containing a float ball 38 to indicate the water pressure in the drinker pipe 28 and may have a stand pipe 36 near each end as shown in FIGS. 2-4. The water pressure in the drinker pipe 28 will be the water pressure delivered at all of the drinkers 30 along the drinker pipe 28.

Figure 1:
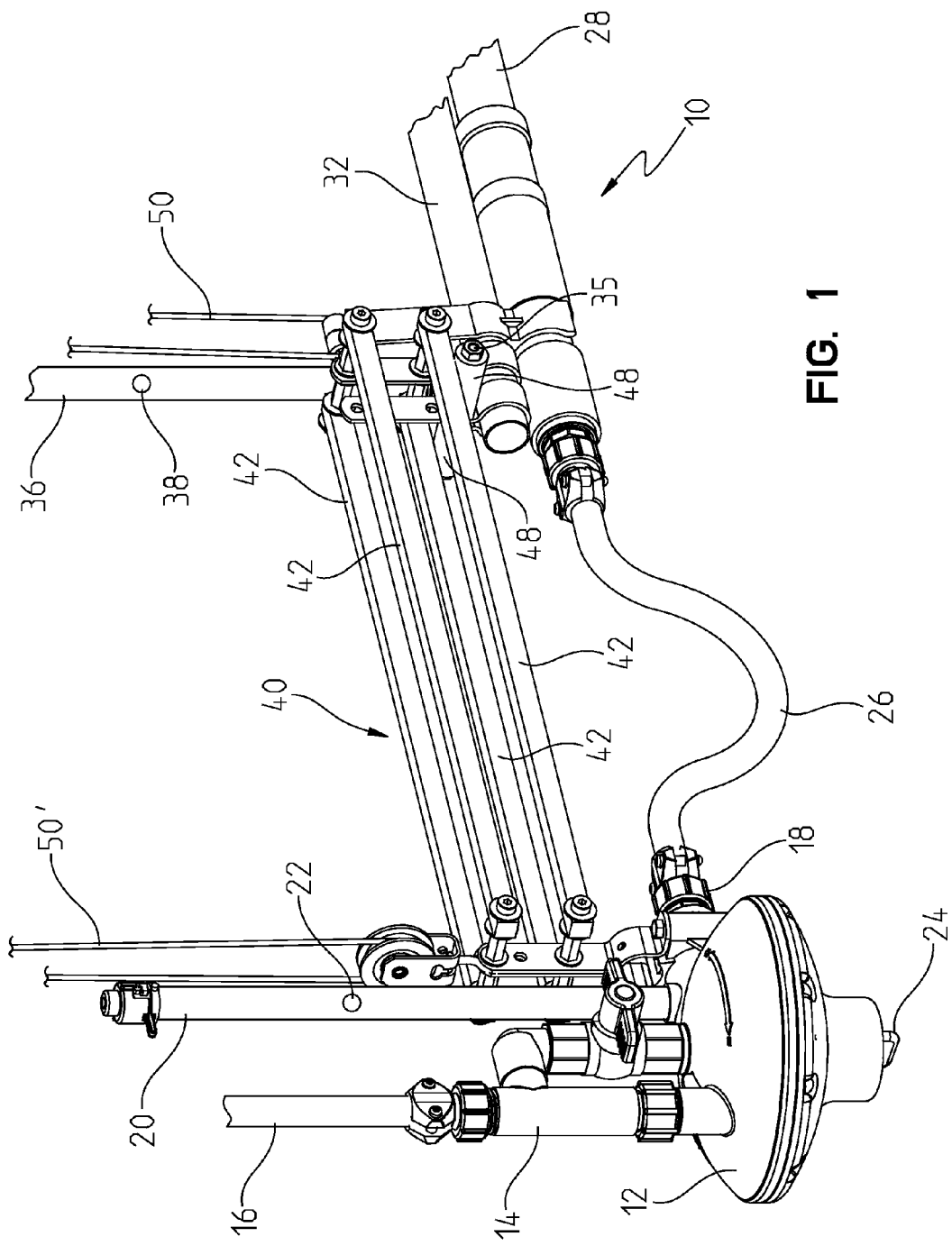
FIG. 1 is a perspective view of the pressure regulator and how it is attached to the drinker pipe in a single winch configuration.

The pressure regulator 12 is connected to the drinker pipe 28 using a four bar linkage 40. The four bar linkage 40 includes a pair of parallel rigid metal tubes or bars indicated at 42 that have a pivoting connection 44 at each end. One end of both tubes 42 is connected to a bracket 34 near the end of the drinker pipe 28. The other ends of the tubes 42 are pivotally connected to a bracket 46 on the pressure regulator 12. The bracket 34 nearest the end of the drinker pipe 28 has stop pegs 48 extending from both sides of the bracket 34 that attach to the bracket 34 with a bolt 35 driven through the bracket 34 and pegs 48. The tubes 42 rest on the stop pegs 48 when the pressure regulator 12 is fully lowered and prevent it from going below the drinker pipe 28. The fully lowered position of the pressure regulator 12 is shown in FIGS. 1 and 2. As the pressure regulator 12 moves between its lowered position and a raised position as shown in FIG. 3, its angle relative to horizontal remains the same.

Figure 10:
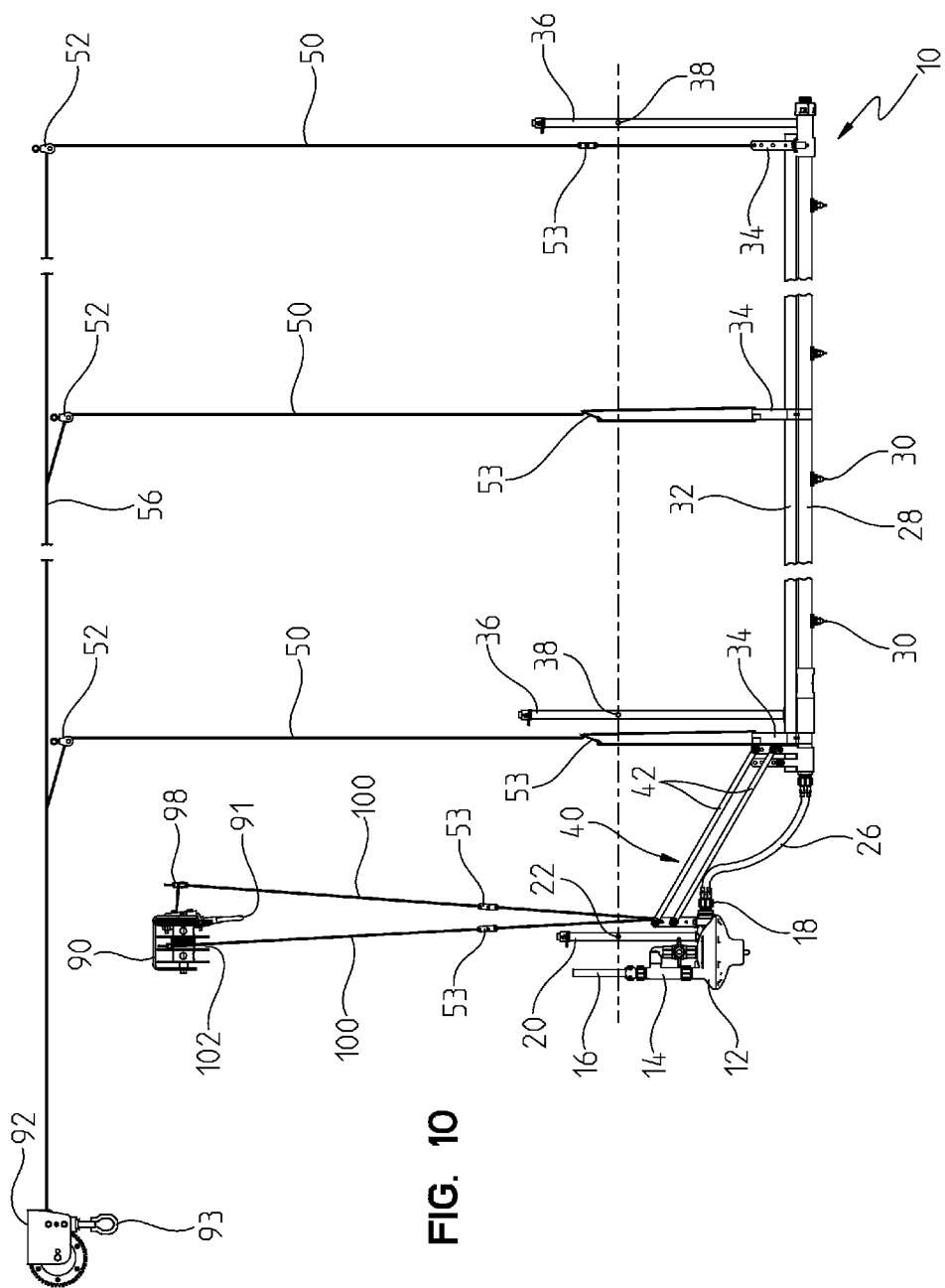
FIG. 10 is a side view of the drinker system shown in FIG. 9 with the pressure regulator in its raised position.

The pressure regulator 12 may be raised relative to the drinker pipe 28 as shown in FIGS. 3 and 10. When the pressure regulator 12 is raised, the pressure in the drinker pipe 28 that is delivered to the drinkers 30 is raised. As mentioned above, changing the adjustment knob 24 on the bottom of the regulator 12 will raise the pressure at the outlet 18 of the pressure regulator 12. Raising the pressure regulator 12 increases the pressure in the drinker pipe 28, but without changing the adjustment knob 24. The pressure in the drinker pipe 28 will be raised by an amount corresponding to the pressure at the bottom of a column of water having a height corresponding to the vertical distance that the pressure regulator 12 is raised relative to the drinker pipe 28. FIGS. 2 and 3, show that the float ball 22 in the stand pipe 20 on the outlet 18 remains in the same position whether the pressure regulator 12 is raised or not. This is because the pressure at the outlet 18 is not changed by raising the pressure regulator 12. The increased pressure in the drinker pipe 30 is indicated by the stand pipes 36 that are on drinker pipe 28 as shown in FIG. 3. The float balls 38 rise to the same level as the float ball 22 in the stand pipe 20 on the pressure regulator 12 as indicated by the broken line drawn through the float balls 22, 38 in FIG. 3. Whatever level the pressure regulator 12 is raised to, the float balls 22, 38 will remain level with each other.

The drinker system 10 of this invention may be suspended in different ways depending on how a user wishes to control the height of the drinkers 30 and the height of the pressure regulator 12. A single winch configuration for suspending the drinker system 10 is shown in FIGS. 1-8. FIGS. 2 and 3 show a regulator drop line 50' connected to the pressure regulator 12, and drinker drop lines 50 that connect to the brackets 34 that hold the drinker pipe 28 to the support pipe 32. The drinker drop lines 50 are run through pulleys 52 attached to a ceiling of the building in which the drinker system 10 is installed. The drinker drop lines 50 are attached to a drinker control line 56 using U-bolt clips that are well known to those skilled in the art. Each drop line 50, 50' has a slidable clip 53 near the end attached to the drinker system 10 that allows adjustment of the length of each drop line 50, 50'. As the drinker control line 56 is pulled toward the left in FIGS. 1-3, the drinker drop lines 50 will be raised, thereby lifting the drinker system 10.

Figure 7:
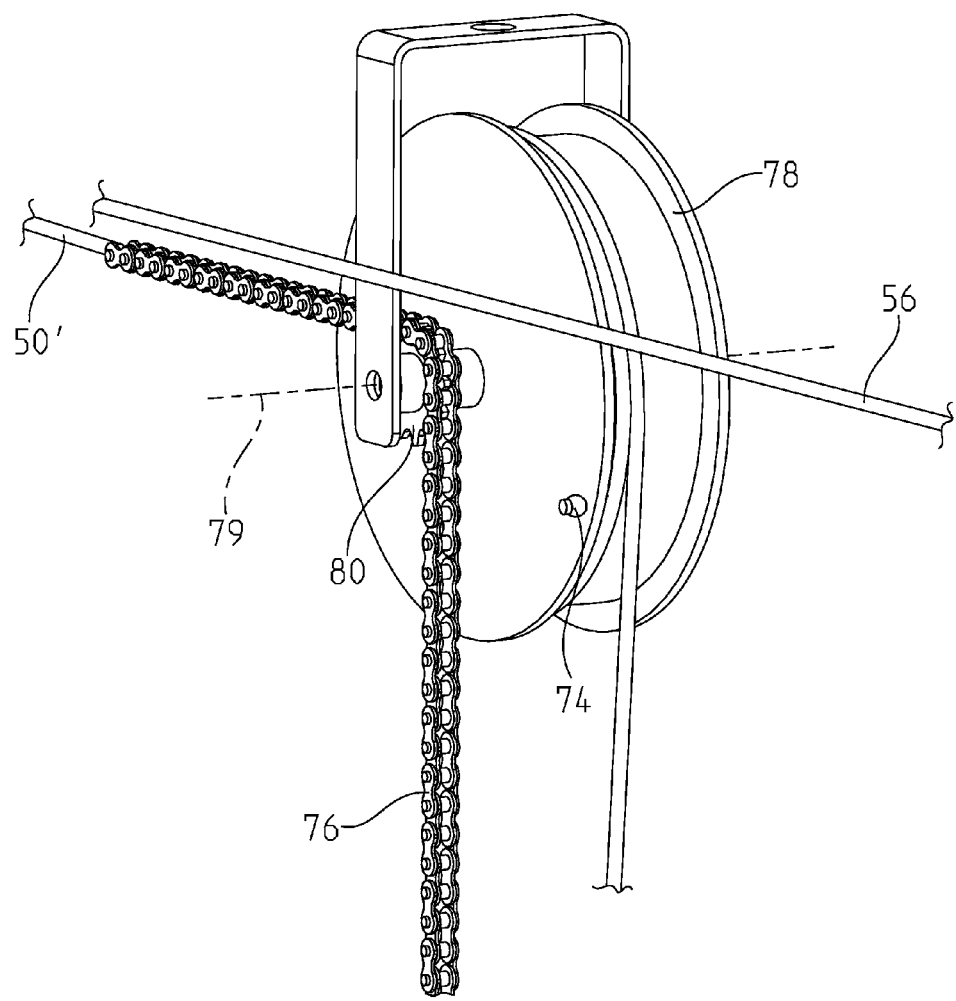
FIG. 7 is a perspective view of the geared sheave used in the single winch drinker system shown in FIG. 1-4.

The regulator drop line 50' has a first end 72, a second end 74 and a segment of chain 76 that is attached within the drop line 50' between the ends. A geared sheave 78 is attached to the ceiling of the building above the pressure regulator 12. FIG. 7 shows the geared sheave 78 in detail. The sheave 78 has a cog 80 on which the chain 76 rides and the cog 80 is rigidly attached to the sheave 78 so that the cog 80 and sheave 78 rotate together. Thus, moving the chain 76 causes the sheave 78 to rotate. The drop line 50' continues down from the chain 76 and travels through a pulley 82 attached to the pressure regulator 12. The second end 74 of the drop line 50' is attached to the sheave 78. As the sheave 78 rotates, it winds the drop line 50' around the sheave.

Figure 5:
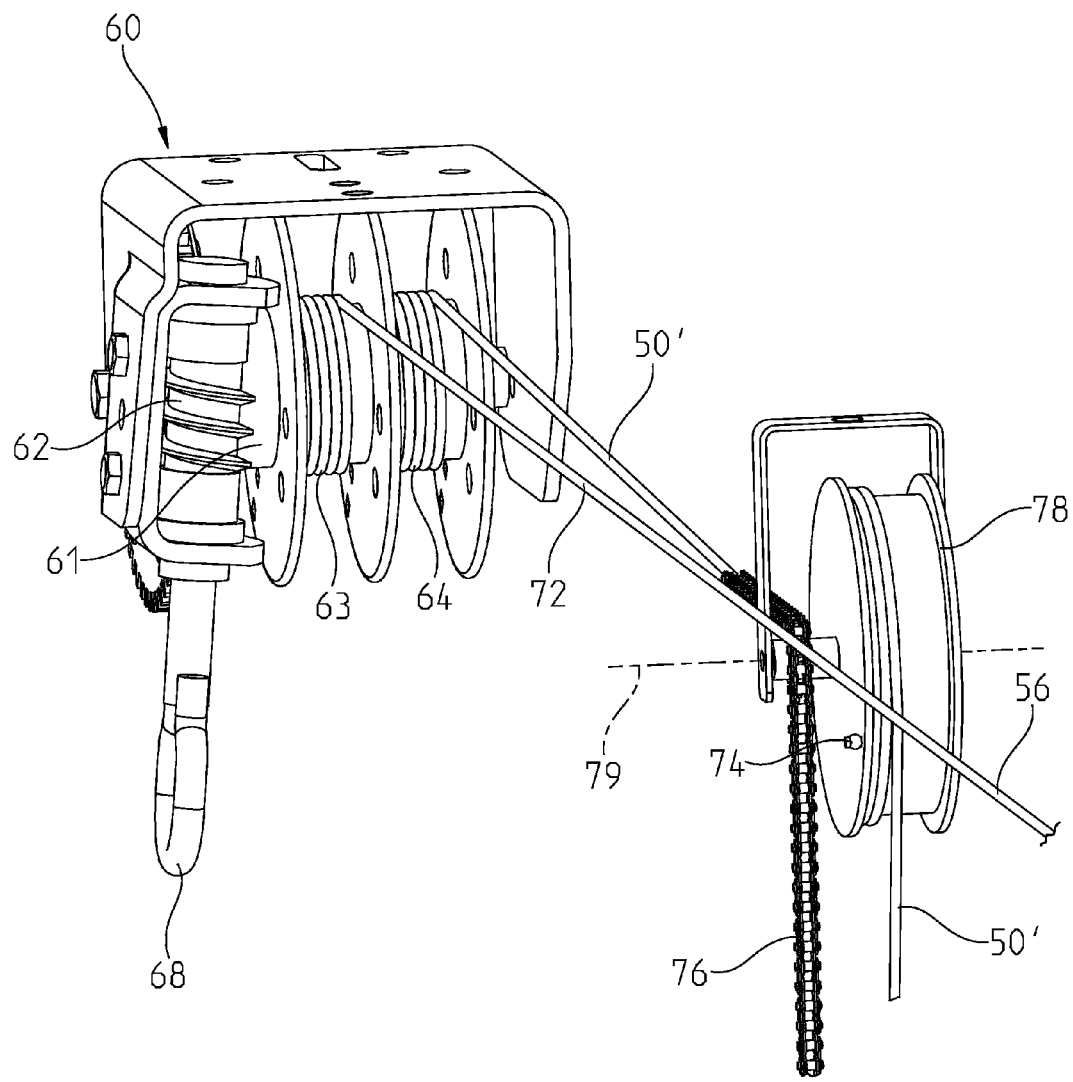
FIG. 5 is a perspective view of the winch and geared sheave used in the drinker system shown in FIGS. 1-4.
Figure 6:
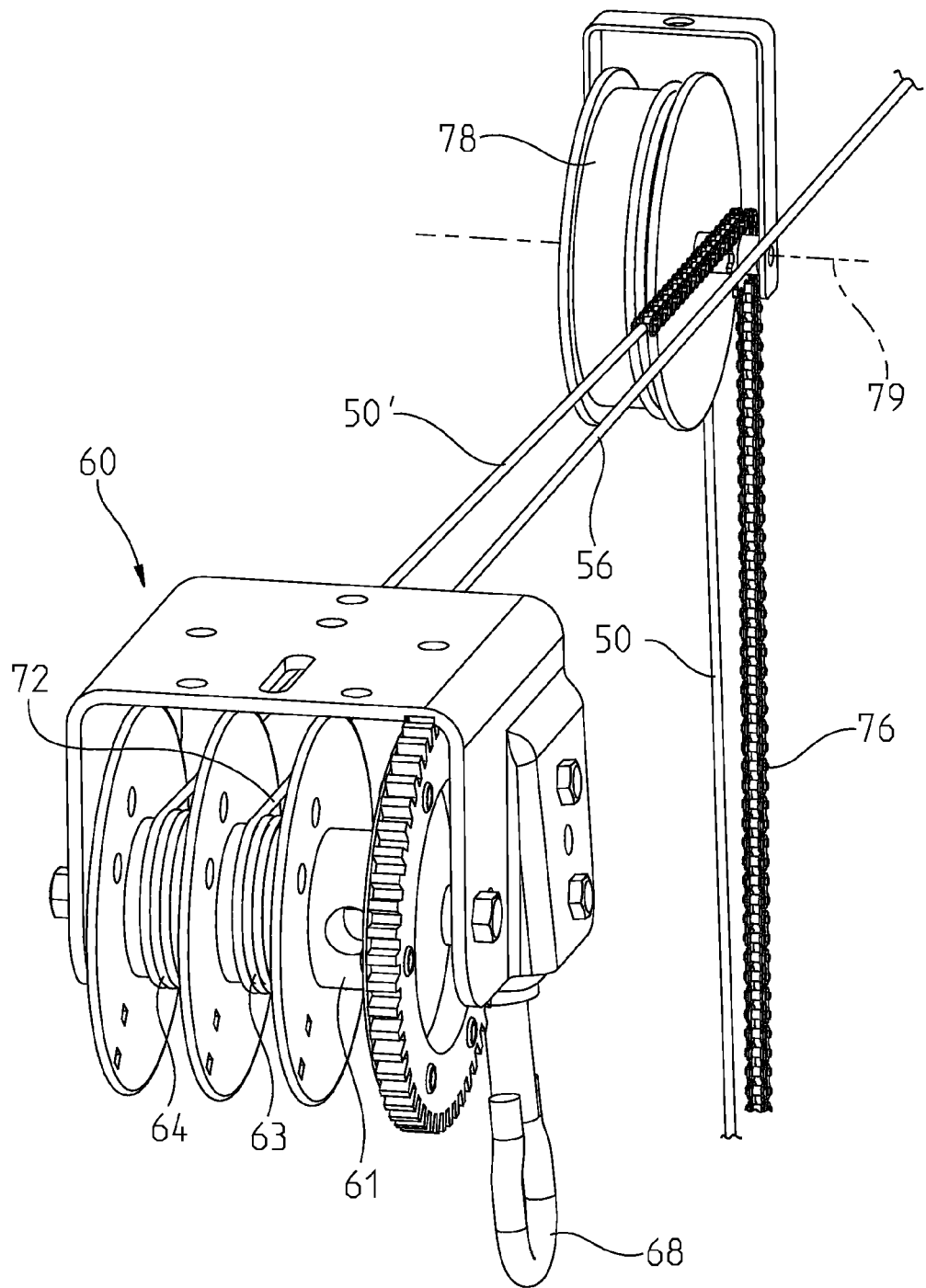
FIG. 6. is another perspective view of the winch and geared sheave shown in FIG. 5.

A winch 60 shown in FIGS. 5 and 6 is used to move the lines 56, 50'. The winch has a first sheave 64, a second sheave 63, and third sheave 61 closest to the worm gear 62. In the configuration shown in FIGS. 1-4 the regulator drop line 50' connected to the pressure regulator 12 is connected to the first sheave 64 and the drinker control line 56 is connected to second sheave 63. The third sheave 61 is not used in this configuration. A hook attached to a crank that is not shown is attached to the eye 68 connected to the worm gear 62 so that the winch 60 can be turned from the ground to wind the lines 56, 50' around their respective sheaves 63, 64. Turning the eye 68 clockwise as viewed from the ground will cause the sheaves 63, 64 to rotate counterclockwise as viewed in FIGS. 2-4 and 8. The lines 56, 50' may be any material of cordage that is flexible enough to be wrapped around a winch and run through pulleys.

When the sheaves 63, 64 on the winch 60 are rotated counterclockwise as viewed in FIGS. 2-4 and 8, the drinker control line 56 will be pulled left, and lift the drinkers 30. The drop line 50' will also be pulled in toward the left. This will cause the chain 76 to rotate the sheave 78 counterclockwise and wind the drop line 50' around the geared sheave 78, thereby lifting the pressure regulator 12. Since the sheaves 63, 64 on the winch 60 are the same size, the winch will wind the drinker control line 56 and drop line 50' by the same amount. The size of the cog 80 or the geared sheave 78 may be designed so that the drop line 50' is wound at a different rate than the drinker control line 56. This may be done so that the pressure regulator 12 is raised more than the drinker pipe 28 as the winch is turned. This configuration will result in higher pressure delivered to the drinkers 30 as the height of the drinkers 30 is raised. This configuration may also be designed for the opposite to happen; the pressure delivered to the drinkers 30 may be reduced as the height of the drinkers is raised. For instance, if the pressure regulator were to begin at a position higher than the drinker pipe 28, the difference in height between the pressure regulator 12 and drinker pipe could be continuously reduced. One way to achieve such a result would be to wrap the drop line 50' the opposite way around the sheave 78 from what is shown in FIGS. 5-8. In such a configuration when the winch pulls the drop line 50' and chain 76 to the left the drop line 50' would unwind from the sheave 78.

Additionally, one skilled in the art of gears and pulleys could design the cog 80 and sheave 78 to provide a variable rate of height change of the pressure regulator 12. Such a system would change the relative height difference between the pressure regulator 12 and drinkers 30 in a ratio that could change with the height of the system 10. This could mean for example, that raising the drinkers 30 one inch from a low starting position could result in the pressure regulator raising two inches, and raising the drinkers 30 another inch could result in the pressure regulator 12 raising only one inch. One way to achieve such a result would be if the cog 80 were eccentric relative to the sheave's 78 axis of rotation 79. Another possible way to obtain a variable rate is to use an oval shaped cog, or another non-round shape to provide a variable gear ratio. Such a non-round cog could be placed within the four bar linkage 40 as opposed to using the ceiling mounted sheave 78 as shown in FIGS. 2-4. The described methods of providing for variable rate of height change drinker suspension systems is not meant to be an exhaustive list of the variants possible with the drinker system 10 of this invention.

Figure 9:
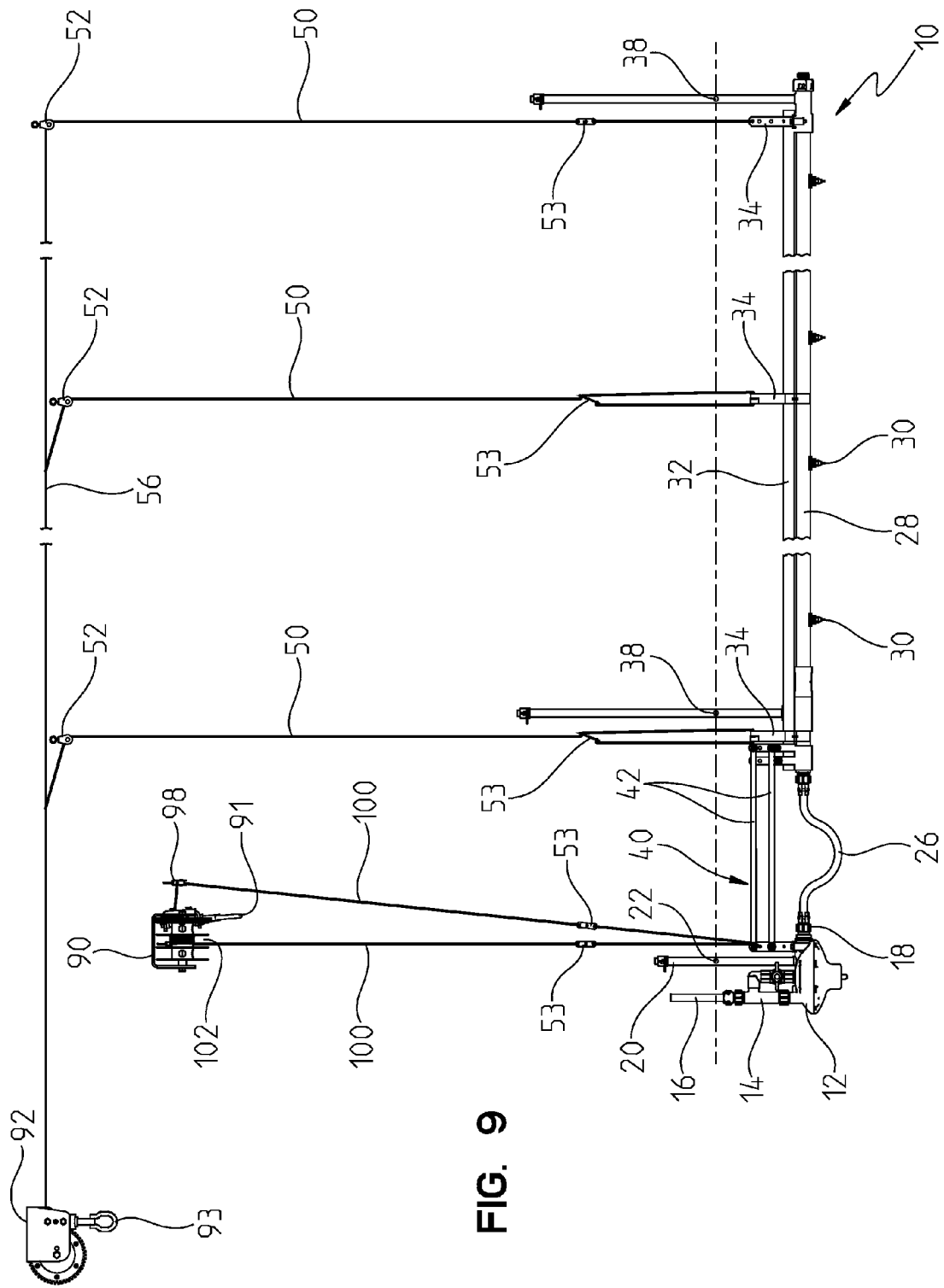
FIG. 9 is a side view of two winch configuration drinker system.
Figure 11:
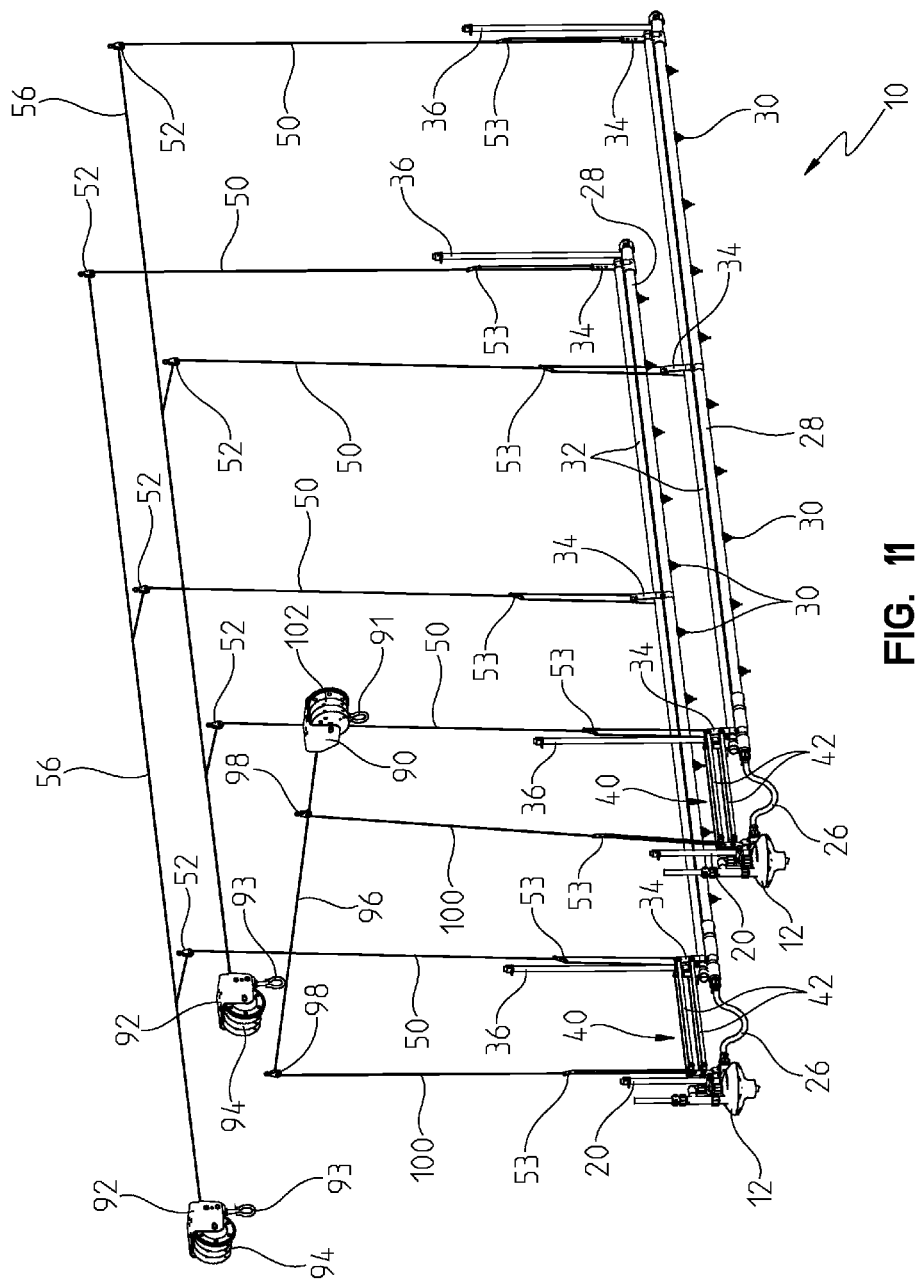
FIG. 11 is a perspective view of a two drinker system shown in FIGS. 9 and 10 with multiple drinker lines suspended from a ceiling.
Figure 12:
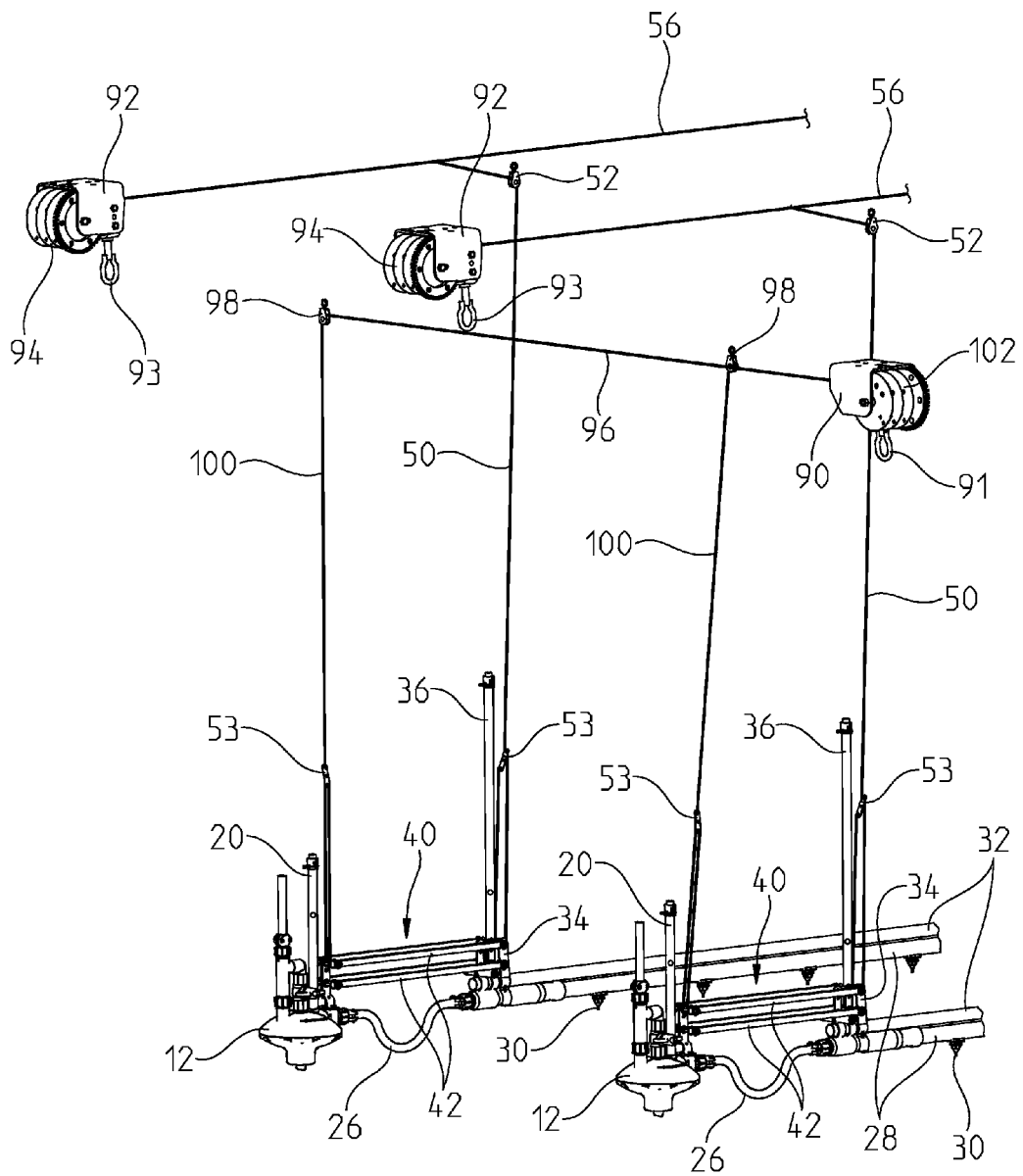
FIG. 12 is a perspective view of the pressure regulators of the system shown in FIGS. 9 and 10.

Another method of suspending the drinker system is shown in FIGS. 9-12. This configuration uses two winches, a regulator winch 90 raises the pressure regulator 12, and a drinker winch 92 raises the drinkers 30. The regulator winch 90 has an eye 91, and the drinker winch 92 has an eye 93 for receiving a hook on a crank (not shown) that is used to turn the respective winch 90, 92. The regulator winch 90 raises the pressure regulator 12 independently of the drinkers 30, and the drinker winch 92 raises the drinkers 30 independently of the pressure regulator 12. The drinker winch 92 is connected to the drinker pipe 28 in the same manner as the winch 60 in the single winch configuration shown in FIGS. 1-8. FIGS. 9 and 10 show a side view of how the drinker winch 92 is connected to the drinkers 30. The drinker control line 56 is connected to the drinker winch 92 to move the drop lines 50 and thus, raise the drinkers 30 as the winch winds the drinker control line 56 around its sheave 94. FIGS. 11 and 12 show a perspective view of how the regulator winch 90 is connected to the pressure regulator 12. These FIGS. also show how the one regulator winch 90 can simultaneously control multiple pressure regulators. The regulator winch 90 is connected to a regulator control line 96 that is run through pulleys 98 connected to regulator drop lines 100. The pulleys 98 are attached to the ceiling of a building housing animals where the drinker system 10 is used. The pulleys 98 are shown somewhat lower than the pulleys 52 on the control line 56 for illustrative purposes. As the sheave 102 on the regulator winch 90 is turned, it will wind the regulator control line 96 around the sheave 102 to raise the pressure regulators 12 of both drinker systems 10. One can easily envision how in this configuration the regulator winch 90 may be used to control many more than just two pressure regulators.

When a user wishes to raise the drinker system 10 of the single winch configuration of FIGS. 1-8, he will insert a hook on a crank handle into the eye 68 of the winch 60. The user will then turn the crank so that the eye 68 is rotated clockwise as viewed from the ground looking up. This will cause the sheaves 63, 64 to rotate counterclockwise as viewed in FIG. 2. The drinker pipe 28 and drinkers 30 will be raised and the pressure regulator 12 will be raised a proportional amount higher than the drinkers 30. Therefore, as the drinkers 30 are adjusted higher for animals that have grown taller, those taller animals will receive water at a higher pressure and easily be able to drink more. If multiple drinker systems 10 are installed in a building housing animals as shown in FIG. 4, each winch 60 will need to be adjusted separately to raise the pressure regulator 12 and drinker pipe 28. If floor conditions of a particular building in which the drinker system 10 is installed dictate an uneven adjustment or fine tuning, each drop line 50, 50' may be changed in length by sliding the slidable clip 53. Doing so enables a user to raise or lower a particular pressure regulator 12 or set the drinkers 10.

The above mentioned procedure may be used to reduce pressure in a single winch system with increases in height if the drinker system is configured as described earlier.

When a user of the two winch configuration wishes to change the height of the pressure regulator 12 and, therefore, the pressure of water delivered to animals at the drinkers 30, he will insert the crank handle into the eye 91 of the regulator winch 90 and turn the crank so that the pressure regulators 12 are raised as shown in FIG. 10. When multiple drinker systems 10 are installed as shown in FIG. 11, all of the pressure regulators 12 will be raised by the same amount. When this is done, the user may decide that the drinkers 30 need to be raised. This is done by turning the eye 93 on each drinker winch 92 for the respective drinker system to be raised. Further adjustment may be necessary to remove slack in the drop lines 100 on the pressure regulators 12. This can be done by again turning the regulator winch 90, or using the slidable clips 53 on each drop line 100 to remove the slack.

The invention is not limited to the details given above but may be modified within the scope of the following claims.

What is claimed is:

1. A drinker system for watering animals having adjustable pressure at drinkers, said system comprising:
   a pressure regulator for providing water at a predetermined pressure at its outlet and receiving water at its inlet;
   at least one drinker for delivering water to an animal, said drinker in fluid communication with said outlet of said pressure regulator, said pressure regulator having a pivotal linkage facilitating movement of said pressure regulator between a lower position and an upper position relative to said drinker, wherein said drinker receives a higher pressure than said predetermined pressure at said outlet when said pressure regulator is in said raised position relative to said drinker.

2. A drinker system as claimed in claim 1, wherein said pressure regulator includes an adjustment mechanism to change said predetermined pressure at its outlet.

3. A drinker system as claimed in claim 1, wherein said pressure regulator is connected to said drinker using a flexible hose.

4. A drinker system as claimed in claim 3, wherein said pivotal linkage is a four bar linkage for maintaining said pressure regulator in a substantially identical angle relative to horizontal during movement from said lower position to said upper position, said four bar linkage including a pair of bars substantially parallel and adjacent to each other, each of said bars being pivotally connected to said drinker at one end and pivotally connected to said pressure regulator at their opposite end.

5. A drinker system as claimed in claim 1, wherein said pressure regulator is suspended by a regulator drop line, said regulator drop line being connected to a regulator winch so that turning said regulator winch will raise or lower said pressure regulator, said drinker being suspended by a drinker drop line, said drinker drop line being connected to a drinker winch so that turning said drinker winch will raise or lower said drinker, said pressure regulator and said drinker being independently vertically movable.

6. A drinker system as claimed in claim 5, wherein said drinker is supported by a plurality of drinker drop lines, said drinker drop lines connected to a control line that is connected to said drinker winch.

7. A drinker system as claimed in claim 6, wherein a plurality of drinkers are in fluid communication along a drinker pipe and said drinker pipe is supported by said drinker drop lines.

8. A drinker system as claimed in claim 7, wherein a plurality of drinker pipes are suspended substantially parallel to each other, each drinker pipe having a corresponding drinker winch and a corresponding pressure regulator, said pressure regulators having a regulator drop line, each said regulator drop line being connected to a regulator control line so that turning said regulator winch will simultaneously raise or lower all of said pressure regulators independently of said drinker pipes.

9. A drinker system as claimed in claim 1, wherein said pressure regulator is suspended by a regulator drop line connected to a winch, and said drinker is suspended by a drinker drop line connected to said winch so that when said winch is turned to change the height of said drinker, the height of the pressure regulator is changed by a different amount.

10. A drinker system as claimed in claim 9, wherein the height of said pressure regulator is changed in proportion to the change in height of the drinker.

11. The drinker system as claimed in claim 9, wherein the rate of change that the pressure regulator is moved changes with changes in height of the drinker system.

12. A drinker system as claimed in claim 9, wherein turning said winch to raise said drinkers raises said pressure regulator.

13. A drinker system as claimed in claim 9, wherein turning said winch to raise said drinkers lowers said pressure regulator.

14. A drinker system as claimed in claim 9, wherein said regulator drop line includes a first end, a second end, and a segment of chain located between said first and second ends, said first end being connected to said winch, said chain riding on a rotatable cog that is fixed relative to said winch, said cog affixed to a sheave that rotates with said cog, said regulator drop line slidingly connected to said pressure regulator, said second end of said regulator drop line attached to said sheave such that said pressure regulator will be raised more than said drinker as said winch is turned to raise said drinker line.

15. The drinker system as claimed in claim 14, wherein said regulator drop line slides through a pulley affixed to said pressure regulator.

16. A method of watering animals comprising the steps:

providing a drinker for delivering water to an animal;

providing a pressure regulator that receives water at its inlet and provides water at a predetermined pressure at its outlet, said drinker in fluid communication with said outlet; and providing a pivotal linkage for elevating said pressure regulator from a lower position to an upper position to increase fluid pressure at said drinker.

* * * * *